United States Patent [19]

Roesler

[11] 4,086,160

[45] Apr. 25, 1978

[54] TREATMENT OF SOLIDS-LIQUID-GAS MIXTURES

[75] Inventor: Frank Cornelius Roesler, Stockton-on-Tees, England

[73] Assignee: Imperial Chemical Industries Limited, London, England

[21] Appl. No.: 703,663

[22] Filed: Jul. 8, 1976

[30] Foreign Application Priority Data

Jul. 10, 1975 United Kingdom .............. 29058/75

[51] Int. Cl.$^2$ ............................................. C02C 1/06
[52] U.S. Cl. ........................................ 210/7; 210/13; 210/14; 210/15; 210/195 R; 210/195 S; 210/199; 210/221 P
[58] Field of Search ........................................ 210/2-9, 210/13-15, 195 R, 195 S, 197, 199, 205, 207, 220, 221 R, 221 P, 252, 258, 262, 44

[56] References Cited

U.S. PATENT DOCUMENTS

| | | | |
|---|---|---|---|
| Re. 22,701 | 12/1945 | Kelly et al. ............................. | 210/44 |
| 1,357,587 | 11/1920 | Peck ...................................... | 210/44 |
| 3,374,893 | 3/1968 | Stretton ............................. | 210/195 S |
| 3,422,007 | 1/1969 | Larkin ....................................... | 210/7 |
| 3,476,682 | 11/1969 | Albersmeyer ........................... | 210/7 |
| 3,945,916 | 3/1976 | Boulenger ................................ | 210/7 |

OTHER PUBLICATIONS

"Breakthrough in Sewage Treatment", *Water Services,* Apr. 1975, pp. 132–140.

*Primary Examiner*—Charles N. Hart
*Assistant Examiner*—Peter A. Hruskoci
*Attorney, Agent, or Firm*—Cushman, Darby & Cushman

[57] ABSTRACT

A solids-liquid mixture, such as waste water, containing biologically degradable material is treated in a circulatory system having alternating upward and downward flow kept in motion by injection of gas such as air. Mixture is diverted from the system into a separating chamber in which solids-enriched mixture is separated by flotation and/or sedimentation. A solids-rich mixture, preferably recycled from the separation chamber, is fed into the system hydrostatically and thereby the concentration of such solids in the system is maintained and/or such solids are transferred from one location to another without mechanical pumping.

7 Claims, 4 Drawing Figures

TREATMENT OF SOLIDS-LIQUID-GAS MIXTURES

This invention relates to a method and apparatus (of the kind hereinafter defined) for the treatment of solids/liquid mixtures to effect separation by flotation and/or sedimentation and possibly also recycling of solids.

The method for the treatment of solids/liquid mixtures is of the kind wherein in a circulatory system having one or more chambers the mixture flows downwardly in one part and upwardly in another part a gas is supplied to and at least partly dissolved in the mixture, preferably during its downward flow, and a portion of the mixture, preferably during its upward flow, passes into a chamber in which separation of solids from the liquid in the mixture occurs by flotation and/or by sedimentation.

The apparatus for the treatment of solids-liquid mixtures is of the kind that comprises a circulatory system having one or more chambers, means for circulating a solids-liquid mixture downwardly in one part and upwardly in another part thereof, means for supplying a gas to the mixture, preferably during downward flow, and a separation chamber connected thereto in a manner such that a portion of the mixture, preferably during upward flow, passes into the separation chamber and undergoes separation of solids from the liquid.

Such a method and apparatus are particularly applicable to treatment of waste water, which term is to be understood to include water carrying any type of biologically degradable domestic and industrial waste materials for example normal domestic waste and the effluents produced by farms, food factories and other industries.

The methods generally employed in the treatment of waste water comprise a primary treatment by physical methods followed by a secondary treatment by biological methods. Insofar as it relates to the treatment of waste water the present invention relates to the secondary treatment stage.

During the secondary treatment of waste water in what is known as the activated sludge process, the waste water is aerated and thereafter partial or total separation of sludge solids from liquid is performed. From the separation step part at least of the separated solids is usually returned to the aeration step so as to maintain the concentration of active solids and for further treatment. In conventional waste water treatment the return of the separated solids to the aeration stage is achieved using mechanical pumps, at least two of which are required when separation is by both flotation and sedimentation, and thus risks of breakdown and costs of regular maintenance are incurred.

According to the present invention we provide a method of treating a solids/liquid mixture in a circulatory system in part of which it flows downward and in another part of which it flows upwards in which a gas is supplied to and at least partly dissolved in the mixture and a portion of the mixture is diverted into a chamber in which solids are separated therefrom by flotation and/or sedimentation, characterised in that mixture relatively rich in solid is fed into the system hydrostatically.

In operating the method of the invention the gas (which is normally air for aerobic treatments) is supplied to the mixture preferably at least partly during its downward flow. Although gas supply in the riser is required at start-up, in order to set up circulation, it can be substantially or wholly shut off during steady operation.

The diverted mixture is driven into the separation chamber preferably by the hydrostatic pressure difference between the diverted and the undiverted mixture in the circulatory system. Since the mixture in upper parts of the circulatory system contains many bubbles but that in the separation chamber contains few, its density if lower than that of the separation chamber mixture, and consequently the mixture level in the circulatory system should be appropriately higher than that in the separation chamber. This is discussed in more detail below.

The mixture relatively rich in solids contains few bubbles and has a higher density than that of the mixture in these parts of the circulatory system in which by the design of the flow path bubbles are present. Preferably this density difference is made use of by feeding the relatively rich mixture to the system at a lower level than that at which diverted mixture is taken off. This mode of operation is especially suitable for recycling separated solids from the chamber to the circulation system.

In order to ensure that mixture entering the separation chamber is sufficiently bubble-free, the diverted portion of the mixture is preferably taken off during upward flow which then by the diversion is directed downwardly, and is caused to flow at a velocity less than that of the rising velocity of the gas bubbles at the take-off level. Means for doing this is described further below.

Also according to the invention we provide apparatus for treating a solids/liquid mixture comprising a circulatory system having one or more chambers, means for circulating solids/liquid mixture downwardly in one part of the system and upwardly in another part thereof, means for supplying a gas to the mixture, a separation chamber connected to the system to receive a portion of the mixture and means to return or feed to the system a mixture relatively rich in solids, the return or feed point being so disposed in the system that the relatively rich mixture is driven into it by means of hydrostatic pressure.

In a preferred apparatus the separation chamber includes off-takes for purified liquid (that is, depleted in solid), sedimentation-enriched mixture and flotation-enriched mixture. Preferably both enriched mixtures therein separated are returned via the rich mixture feed point.

Preferred apparatus of the present invention includes means for providing the preferred features of the method of the invention. The method and apparatus are suitable for the use in conjunction with the invention described and claimed in our co-pending UK Application No. 14142/75 (New Zealand application 180494), namely a method for solids-liquid separation wherein a solids-liquid mixture is circulated around a circulatory system comprising at least two substantially vertical ducts communicating with each other at their upper and lower ends such that it flows downwardly in one part of the system and upwardly in another part of the system, a gas being supplied to and at least partly dissolved in the mixture, preferably in the downwardly flowing mixture, and a portion of the upwardly flowing mixture containing dissolved gas passing into a flotation chamber connected to the circulatory system, in which flotation chamber the hydrostatic pressure gradually decreases as the mixture flows upwards and consequently gas is released from solution and forms gas bubbles attached to solid particles present in the mixture which carry the solid particles to the top of the liquid in the mixture; preferably the solid particles carried to the top of the liquid and the resulting clarified liquid below are removed separately from the flotation chamber.

That application also describes and claims an apparatus for solids-liquid separation comprising a circulatory system with a flotation chamber connected thereto, the circulatory system comprising at least two substantially vertical ducts communicating with each other at their upper and lower ends means for circulating a solids-liquid mixture around the system so that it flows downwardly in one part of the system and upwardly in another part of the system and means for supplying a gas to the mixture, preferably to the downwardly circulating mixture in the system, the flotation chamber being connected to the system in a manner such that a portion of the upwardly flowing mixture containing dissolved gas in the system passes into the flotation chamber and flows upwardly therein; preferably said flotation chamber is provided with means for removing solid particles from the top of the liquid therein and means for withdrawing clarified liquid.

In our co-pending cognated UK Applications Nos. 23328/73 and 53921/73 — corresponding to Belgian Patent No. 815,150 and New Zealand application 174262 we describe an apparatus for the circulation of liquids comprising a chamber of descending flow (hereinafter referred to as the downcomer) and a chamber of ascending flow (hereinafter referred to as the riser) communicating with each other at their upper and lower ends, means being provided for supplying a gas to liquid in the downcomer. This apparatus may be used in the aeration and/or digestion stages in the biological treatment of waste water, the waste water being circulated around the downcomer/riser system and supplied with an oxygen-containing gas as it passes through the downcomer. When the present invention is used in conjunction with that apparatus (which will form the circulatory system) and with the waste water treatment method descirbed therein, the separation chamber is suitable connected to the riser and a portion of the solids-liquid mixture such as waste water flowing up the riser passes into the separation chamber.

In explanation of the principle underlying the present invention we refer to FIG. 4 of the accompanying drawings. This shows a main pipe 21, containing upwardly flowing solids-liquid mixture in which gas bubbles are present, and a side loop 22 connected to the main pipe through openings 23 and 24. Solids-liquid mixture enters side loop 22 through upper opening 23 and returns to the main pipe through lower opening 24 which is narrower than upper opening 23. In the equations which follow the symbols have the following meanings:

$H$ = Effective hydrostatic head difference between 24 and 23.
$h$ = Geometrical height difference between 24 and 23.
$g$ = Accelaration of gravity.
$E$ = Mean voidage fraction in main pipe 21 between 24 and 23.
$A$ = Area of opening 24.
$B$ = Area of opening 23.
$u$ = Velocity of flow through opening 24.
$w$ = Velocity of flow through opening 23.
$s$ = Bubble rising velocity in main pipe 21 at the level of 23.

The above parameters are related as follows:
$H = Eh$
$Au = Bw$
$u = \sqrt{2gH}$ (neglecting friction in loop 22 and assuming that opening 24 is narrower than opening 23, so that $u$ is large compared with $w$).

When the system is operated such that $w$ is less than $s$, no bubbles will enter side loop 22 from main pipe 21. In the method and apparatus of the present invention the flow of the mixture in the conduit leading to the separation chamber is designed to be less than the flow that would exceed in velocity the bubble rising velocity in the systen, at the level at which mixture passes from the system downwardly into the conduit leading to the separation chamber.

Preferably the separation chamber is a flotation chamber as described in co-pending UK Application No. 14142/75 with means for recycling separated solids. This chamber is preferably located for the greater part of its length inside or adjacent to the riser of the apparatus of co-pending cognated UK Applications Nos. 23328/73 and 53921/73. Solids-liquid mixture preferably enters the flotation chamber at or near its lower end, suitably through a plurality of openings each equipped with a trap or traps to prevent stray gas bubbles from entering the flotation chamber. The upper part of the flotation chamber preferably widens to form a flotation basin. Floated solids rise to the top of the clarified liquid in this basin whilst the sinking solids which remain go to the bottom. The clarified liquid passes out of the flotation basin. In the method and apparatus of the invention conduits are provided to return the floated and preferably also the sinking solids to the circulatory system. The floated and sinking solids may enter the system separately but preferably the conduits bearing them are joined outside the system and all returned solids enter the system at the same level. The conduit carrying the solids may for convenience be a pipe suspended in the riser.

The returned solids re-enter the system at a level sufficiently below that at which the solids-liquid mixture leaves the system for the hydrostatic head difference H to achieve the desired rate of recirculation of solids.

In the operation of the method and apparatus the velocity of liquid flow into the conduit leading to the separation chamber is suitably not greater than 10cm sec$^{-1}$, preferably less than 5cm sec$^{-1}$. The velocity of not above 10cm sec$^{-1}$, when a suitable trap and louvre means is used, ensures that no bubbles larger than 1mm diameter enter the separation chamber. At the level at which the liquid is diverted into the separation chamber the voidage in the mixture in the riser is suitably 5 – 25% v/v, preferably 10 – 20% v/v. The velocity of upward flow of liquid in the flotation chamber is suitably not more than 0.3m sec$^{-1}$, especially not more than 0.1m. Thus using (as is preferred) a separation chamber having a depth in the range 20 – 40 m, the residence time of the ascending mixture therein is on average at least 60 seconds and can exceed 400 seconds, for example 1000 seconds or more.

The depth of the riser and downcomer chambers is suitably at least 40m below the liquid level at the top of the circulatory system, that is in the gas disengagement basin (item 1 in the drawings). Preferable depth depends on the treatment duty (as measured by the required rate of oxygen transfer) and strongly on the shaft size (diameter), which determinds hydraulic friction. Suitably depths for shafts 2m to 3m diameter are at least 80m, and for very large shafts (greater than 5m diameter) 150 - 250m. The ratio of the cross-sectional area of the separation chamber to that of the riser depends on the the treatment time required in the circulatory system; in general it may be in the range 0.01 to 2.0, but will normally be in the range 0.25 to 2.0 for readily degradable effluents.

The invention provides a means whereby in waste water treatment airlift pumping may be used to carry out the auxiliary duty of moving liquor and/or sludge to and from flotation and sedimentation basins. This is achieved by tapping the flow in the circulatory system at two or more different levels so that the voidage in the system multiplied by the level difference supplies the driving head. The use of mechanical pumps with their attendant difficulties is avoided.

The invention when used for waste water treatment is illustrated by the accompanying drawings wherein.

Figures 1, 4:
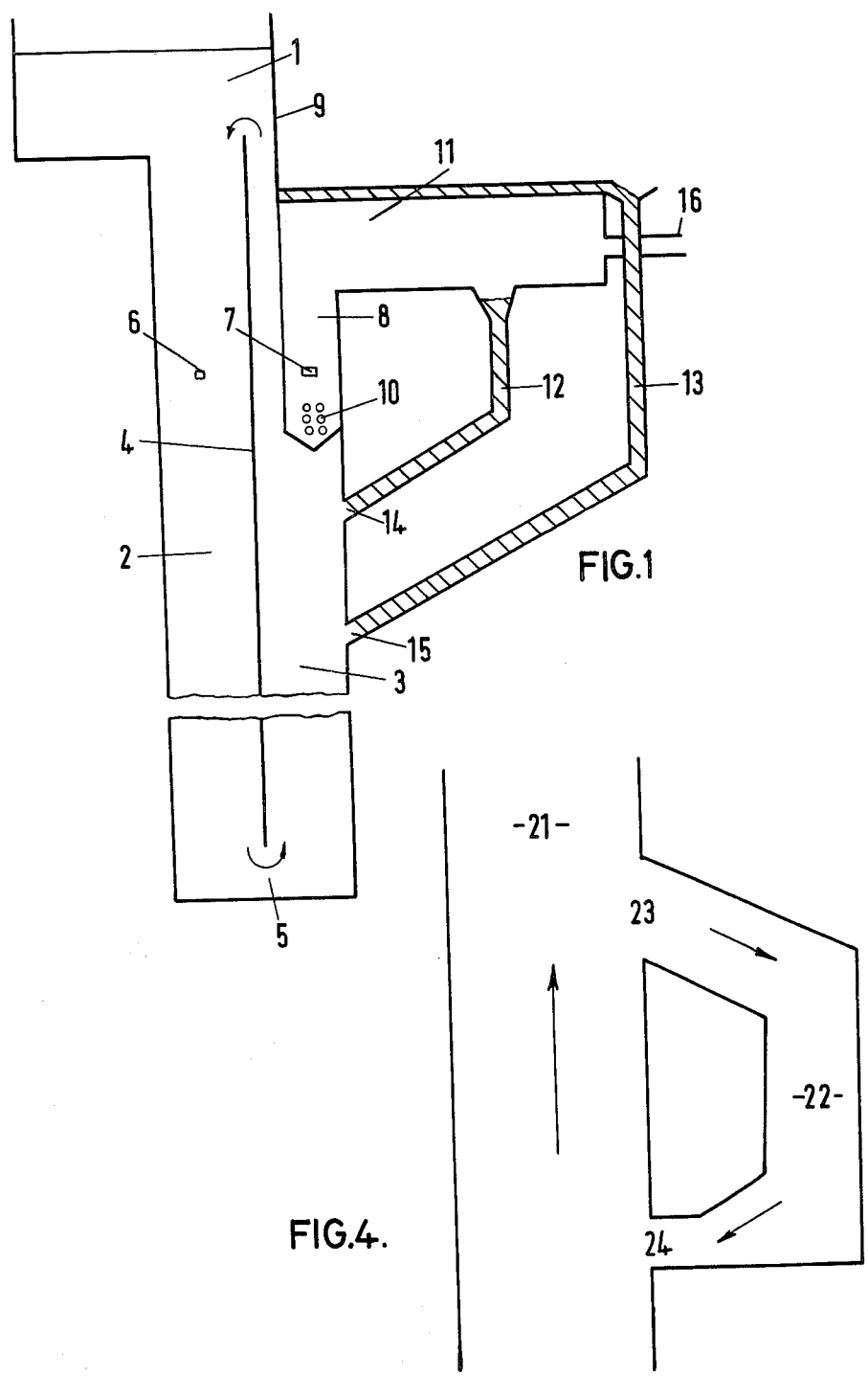
FIG. 1 is a diagram of one form of the apparatus.
FIG. 4 is a diagram explaining the principle underlying the present invention.

The apparatus shown in FIG. 1 has a gas disengagement basin 1, into which a waste water conduit (not shown) feeds, with a deep shaft extending below it and containing downcomer 2 and riser 3 defined by partition 4. Downcomer 2 and riser 3 communicate with each other at their upper ends in disengagement basin 1 and at their lower ends through opening 5 below the lower end of partition 4. Oxygen-containing gas may be injected into downcomer 2 and riser 3 through spargers 6 and 7 respectively. Towards its upper end riser 3 is divided to form a separation chamber 8 located within the riser but separated from disengagement basin 1 by-partition 9. Chamber 8 communicates with riser 3 through a plurality of circular openings which together form trap 10. The upper end of chamber 8 forms separation basin 11 situated alongside but at a lower level than disengagement basin 1. From basin 11 sinking sludge return pipe 12 and floated sludge return pipe 13 lead into riser 3 through openings 14 and 15 in the wall thereof below the lower end of chamber 8. Also from basin 11 liquor take-off pipe 16 connects with later stages in the treatment system.

Figure 2:
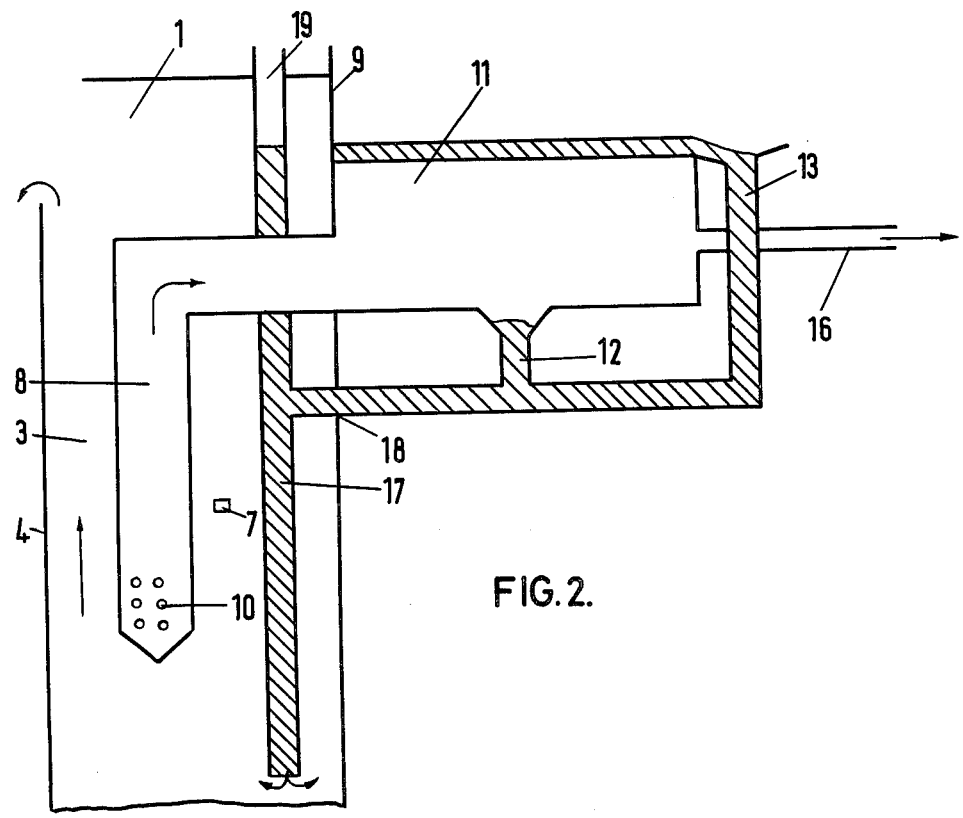
FIG. 2 is a diagram of more compact form of the apparatus, a portion only being shown comprising the upper part of the riser and associated flotation and sedimentation recycle sections.

The apparatus shown in FIG. 2 differs from that shown in FIG. 1 in the detailed construction of the sludge recycle system. In the apparatus of FIG. 2 separation chamber 8 is located for a major part of its length approximately centrally within riser 3 instead of to one side. Sinking solids return pipe 12 and floated solids return pipe 13 join one another outside riser 3 and the resulting joint solids return pipe 17 is suspended in the riser having entered it through opening 18 in its outer wall. Return pipe 17 has upward extension 21 to facilitate access for removal of any blockage that may occur. Ths construction is more compact than that of FIG. 1 and entails less digging during its installation, if the shaft is beneath ground level.

Figure 3:
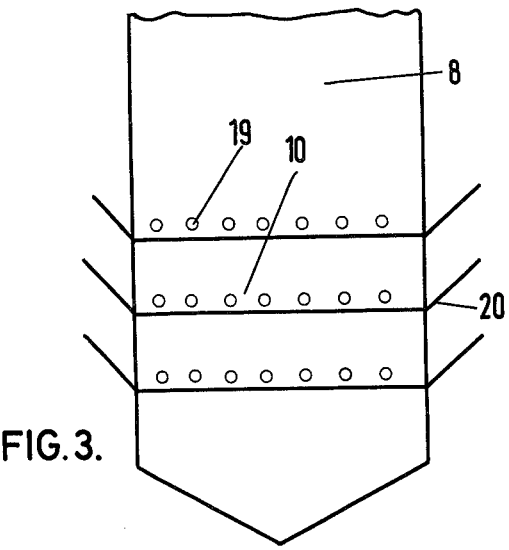
FIG. 3 is a diagram of a simple form of trap to prevent large bubbles of gas from entering the flotation chamber. Such a trap may be used in the apparatus of FIGS. 1 and 2.

The trap shown in FIG. 3 comprises three rows of circular holes 19, each row having associated with it a skirt 20. With this trap built onto separation chamber 8, if the flow of liquid from riser 3 through holes 19 is relatively slow, bubbles in the liquid flowing up the riser will sweep past the trap and fail to enter chamber 8.

In both forms of the apparatus shown in the drawings start-up is achieved by injecting air from a compressor into riser 3 through sparger 7. This causes the upper part of riser 3 to operate as an air-lift pump and waste water begins to circulate around the apparatus in the direction shown by the arrows in FIG. 1. When the flow rate reaches a predetermined minimum value the injection of air into the downcomer 2 through sparger 6 is commenced and gradually increased. Preferably this is done in stages. When the system is operating steadily all or most of the air is injected into downcomer 2.

Gas bubbles injected into the downcomer are borne rapidly downwards by the circulating waste water to levels of higher pressure and their size diminishes. Ultimately in the lower levels many of the bubbles will be entirely absorbed into the waste water. As the waste water rises up the riser the bubbles will first reappear and then increase in size. Part of the waste water flowing up riser 3 passes through trap 10 into separation chamber 8. Trap 10 prevents large air bubbles already present when the waste water reaches the lower end of chamber 8 from passing into and thereby disturbing the flow within it. In chamber 8 small air bubbles form in the waste water, attach themselves to solid particles and rise to the surface of the liquid in basin 11 carrying the solid particles with them. Thus solid material in the waste water is carried to the surface of the liquid in basin 11 by air flotation.

From basin 11 liquid passes along liquor take-off pipe 16 to later stages in the overall waste water treatment system where it is further treated by de-gassing and final sedimentation. Sludge passes into floated sludge return pipe 13 or sinking sludge return pipe 12 (for any sludge which settles to the bottom of basin 11) and is returned to riser 3 for further treatment.

Referring to the discussion of the operation of the system earlier in this specification, in FIG. 1:

B = sum of the areas of the openings in trap 10
A = sum of the areas of openings 14 and 15
$H_1$ = hydrostatic head difference between trap 10 and opening 14 (sinking solids)
$H_2$ = hydrostatic head difference between trap 10 and opening 15 (floated solids)

and in FIG. 2:

H = hydrostatic head difference between trap 10 and the bottom of return pipe 17.

In both forms of the apparatus the flow through the return pipes does not exceed the volume of liquid which can pass into chamber 8 through the openings in trap 10 without exceeding the bubble rising velocity.

I claim:

1. A method of treating a waste water mixture containing solid particles and biologically degradable material in apparatus including a basin, a downcomer, a riser operatively communicating with the downcomer both through the basin and at the lower end of the downcomer, and a floatation chamber operatively connected to the riser and extending upwardly therefrom, said method comprising the steps of continuously circulating the mixture contained in the basin-downcomer-riser system down said downcomer, up said riser, and back down said downcomer until sufficient treatment of the biologically degradable material is achieved, and supplying oxygen-containing gas to said downcomer so that said gas flows co-currently with mixture flowing down said downcomer, and upwardly with said mixture in said riser, at least some of the oxygen-containing gas being dissolved in said mixture: separating a portion of the upwardly moving mixture in the riser with dissolved gas contained therein from the mixture moving upwardly in the riser, by diverting it into the floatation chamber, at a first vertical level of the riser; and gradually decreasing the hydrostatic pressure on said separated portion to release gas from solution to form gas bubbles attached to solid particles present in said separated mixture portion and thereby effectively separate the solid particles from the liquid in the separated mixture portion to produce a floated solids-enriched mixture, wherein the improvement comprises hydrostatically feeding the floated solids-enriched mixture into the riser from the chamber at a second level, below said first level, the driving force for entry at the second level being provided by the lower relative density, as a result of its content of gas bubbles, of the mixture flowing upwardly in the riser.

2. A method according to claim 1 in which solids are further separated by sedimentation in said chamber to produce two distinct solids-enriched mixtures, and further comprising the step of uniting said mixtures before recycling them.

3. Apparatus for solids-liquid mixture treatment comprising a basin, a downcomer having an upper opening therefor in operative communication with said basin and extending downwardly of said basin to a bottom opening, a riser having a bottom opening thereof in communication with the bottom opening of said downcomer and having an upper opening thereof in operative communication with said basin, said basin, downcomer, and riser comprising a basin-downcomer-riser system, means for continuously circulating the mixture contained in the basin-downcomer-riser system down said downcomer, up said riser, and back down said downcomer until sufficient treatment of the mixture is achieved, and means for supplying gas to said downcomer so that said gas flow co-currently with mixture in said riser; a floatation chamber operatively connected to said riser at a first vertical level and extending upwardly therefrom, and means associated with said floatation chamber for effecting passage of a portion of the upwardly moving mixture in said riser with dissolved gas therein into said floatation chamber so that gas is released from solution during upward flow of mixture in said floatation chamber to form gas bubbles attached to solid particles present in said upwardly flowing mixture to carry the solid particles to the top of the liquid in said floatation chamber, and produce a floated solids-enriched mixture, wherein the improvement comprises means for hydrostatically beeding the floated solids-enriched mixture to said riser from said chamber at a second vertical level, lower than said first level, so that the mixture flows hydrostatically into said riser from said chamber.

4. Apparatus according to claim 3 which the floatation chamber includes off-takes, for purified liquid and for sedimentation-enriched mixture.

5. Apparatus according to claim 3 including means for hydrostatically feeding said sedimentation enriched mixture to said riser from said chamber.

6. Apparatus according to claim 4 including conduit means for hydrostatically recycling both enriched mixtures to the system, the said conduits being united before the point of entry to the system.

7. Apparatus according to claim 3 including means to feed to the system the product of a primary water treatment process.

* * * * *